United States Patent
Cha et al.

(10) Patent No.: US 9,431,173 B2
(45) Date of Patent: Aug. 30, 2016

(54) METHOD FOR MANUFACTURING PLASTIC DIELECTRIC HAVING HOLES AND PLASTIC DIELECTRIC MANUFACTURED THEREBY

(71) Applicant: INDUSTRY-ACADEMIC COOPERATION FOUNDATION YONSEI UNIVERSITY, Seoul (KR)

(72) Inventors: Sung Woon Cha, Goyang-si (KR); Young Ho Kim, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 8 days.

(21) Appl. No.: 14/336,110

(22) Filed: Jul. 21, 2014

(65) Prior Publication Data

US 2015/0025166 A1 Jan. 22, 2015

(30) Foreign Application Priority Data

Jul. 22, 2013 (KR) .................. 10-2013-0086186

(51) Int. Cl.
*H01G 4/18* (2006.01)
*B29C 44/34* (2006.01)
(Continued)

(52) U.S. Cl.
CPC ............ *H01G 4/18* (2013.01); *B29C 44/3453* (2013.01); *B29K 2023/12* (2013.01); *B29K 2025/08* (2013.01); *B29K 2027/18* (2013.01); *B29K 2055/02* (2013.01); *B29K 2067/003* (2013.01); *B29K 2069/00* (2013.01); *B29K 2081/04* (2013.01); *B29K 2101/12* (2013.01); *B29K 2105/04* (2013.01); *B29K 2105/041* (2013.01);
(Continued)

(58) Field of Classification Search
CPC ............ B29C 44/348; B29C 44/0415; B29C 44/3415; C08J 9/122
See application file for complete search history.

(56) References Cited

U.S. PATENT DOCUMENTS

2008/0180883 A1 7/2008 Palusinski et al.
2013/0011657 A1* 1/2013 Kato ...................... C08J 9/0061
428/317.3
2016/0137806 A1* 5/2016 Kumar ...................... C08J 9/28
521/97

FOREIGN PATENT DOCUMENTS

KR 10-2000-0049279 A 7/2000

OTHER PUBLICATIONS

Kumar, V.; VanderWel, M.; Weller, J.; Seeler, K.A. Experimental Characterization of the Tensile Behavior of Microcellular Polycarbonate Foams. J Engineering Materials and Tech. Oct. 1994, vol. 116 pp. 439-445.*

Krause, B.; Mettinkhof, R.; van der Vegt, N. F.A.; Wessling, M. Microcellular Foaming of Amorphous High-Tg Polymers Using Carbon Dioxide. Macromolecules 2001, 34, 874-884.*

(Continued)

*Primary Examiner* — Mike M Dollinger
*Assistant Examiner* — Christina Wales
(74) *Attorney, Agent, or Firm* — LRK Patent Law Firm

(57) ABSTRACT

A method for manufacturing a plastic dielectric having a plurality of holes and a plastic dielectric manufactured thereby. The method for manufacturing a plastic dielectric includes the steps of: (a) injecting a plastic material into an airtight container; (b) injecting inert gas into the airtight container at pressure of 5 to 9 MPa; (c) maintaining the temperature inside the airtight container at 20 to 50° C.; (d) leaving the airtight container for a predetermined period till an amount of inert gas dissolved in the plastic material becomes 6% wt or more and drawing the plastic material out of the airtight container; and (e) heating the plastic material at temperature of 40 to 110° C.

7 Claims, 6 Drawing Sheets

(51) Int. Cl.
  *B29K 101/12* (2006.01)
  *B29K 105/04* (2006.01)
  *B29L 31/34* (2006.01)
  *B29K 23/00* (2006.01)
  *B29K 27/18* (2006.01)
  *B29K 55/02* (2006.01)
  *B29K 67/00* (2006.01)
  *B29K 69/00* (2006.01)
  *B29K 81/00* (2006.01)
  *B29K 25/00* (2006.01)

(52) U.S. Cl.
  CPC ... *B29K 2995/0006* (2013.01); *B29L 2031/3406* (2013.01); *C08J 2205/042* (2013.01)

(56) References Cited

OTHER PUBLICATIONS

S.H. Cho et al., "A Study on Optical Characteristics and Cell Morphology of Microcellular Foamed Plastics", Korean Society for Precision Engineering, Spring Symposium 2009, pp. 759-760, Seoul, Republic of Korea.

C.H. Hyun et al., "Study on the Surface Improvement for MCPs Injection Molding Products Using Polymer Mold", Korean Society for Precision Engineering, Spring Symposium 2008, pp. 213-214, Seoul, Republic of Korea.

* cited by examiner

METHOD FOR MANUFACTURING PLASTIC DIELECTRIC HAVING HOLES AND PLASTIC DIELECTRIC MANUFACTURED THEREBY

BACKGROUND OF THE INVENTION

1. Field of the Invention

The present invention relates to a method for manufacturing a plastic dielectric having a plurality of holes and a plastic dielectric manufactured thereby, and more particularly, to a method for manufacturing a plastic dielectric having a plurality of holes and a plastic dielectric manufactured thereby which can increase a dielectric constant through a ultrafine porous structure.

2. Background Art

In general, a capacitor which is an important element for organizing an electronic circuit is used for obtaining capacitance and has a structure that a dielectric is interposed between two pole plates.

Such a capacitor must be selected in consideration of dielectric strength to operational voltage as well as capacity because its function is varied according to frequencies or waveforms.

Particularly, a solid capacitor has lifespan which is six times longer than that of a general electrolytic capacitor because the solid capacitor has excellent durability, heat resistance and electrical resistance.

In general, the solid capacitor is an electronic component to store electricity or to interrupt a direct current and pass an alternating current, and may be called a tantalum capacitor because it has an element mainly made of tantalum.

FIG. 1 is a view showing a structure of a conventional solid capacitor, and FIG. 2 is a mimetic diagram of the conventional solid capacitor and a conventional electrolytic capacitor.

Referring to FIGS. 1 and 2, the formal title of the solid capacitor is a solid aluminum electrolytic capacitor, and is one of the first-class capacitors which are presently in common use. The solid capacitor is distinguished from the electrolytic capacitor in that the dielectrics are different from each other.

In general, the electrolytic capacitor uses liquid electrolyte, but the solid capacitor uses solid organic polymer. The solid capacitor has high conductivity and is resistant to high temperature.

In detail, the solid capacitor has excellent low loss and high dielectric properties because it uses a plastic material as a dielectric material. For the plastic material, there are cellophane resin, cellulose resin, polyethylene (PE) resin, polypropylene (PP) resin, and so on.

Such a solid capacitor is provided in a surface-mounted chip type in order to be used in compact-sized electronic equipment, and includes: a condenser element; an anode lead frame connected with an anode lead wire of the condenser element; and a cathode lead frame connected with the condenser element by conductive adhesive.

Recently, there is a growing interest in studies on compact-sized and high-efficient solid capacitors, and for this, there is a growing need for technology to enhance performance of plastic dielectrics.

CITED REFERENCES

Korean Patent No. 10-0424909

SUMMARY OF THE INVENTION

Accordingly, the present invention has been made to solve the above-mentioned problems occurring in the prior arts, and it is an object of the present invention to provide a method for manufacturing a plastic dielectric having a plurality of holes and a plastic dielectric manufactured thereby which can increase a dielectric constant through an ultrafine porous structure.

To accomplish the above object, according to the present invention, there is provided a method for manufacturing a plastic dielectric having a plurality of holes at one side comprising the steps of: (a) injecting a plastic material into an airtight container; (b) injecting inert gas into the airtight container at pressure of 5 to 9 MPa; (c) maintaining the temperature inside the airtight container at 20 to 50° C.; (d) leaving the airtight container for a predetermined period till an amount of inert gas dissolved in the plastic material becomes 6% wt or more and drawing the plastic material out of the airtight container; and (e) heating the plastic material at temperature of 40 to 110° C.

Moreover, in the step (e) of heating the drawn-out plastic material, the drawn-out plastic material is soaked in glycerin or water heated at 40 to 110° C.

Furthermore, the step (e) of heating the drawn-out plastic material is either the step of using conduction by a plate heater or the step of using radiation by an IR heater.

Additionally, the inert gas is $CO_2$, $N_2$, He or Ar.

In addition, each of the pores has the radius of 1.0 µm or less.

Moreover, the plastic material is one or a mixture of two or more materials selected from a group composed of polyethylene terephthalate (PET), polypropylene (PP), acrylonitrile butadiene styrene copolymer (ABS), polyester, poly carbonate (PC), polyphenylene sulfide (PPS) and polytetrafluoroethylene (PTEE).

Furthermore, the sponge structure has 1,000,000,000,000 pores per 1 $cm^3$.

Additionally, in the step (d), the predetermined period is 30 minutes to 180 minutes.

In addition, in the step (d), the plastic material is drawn out of the airtight container by injection or extrusion.

In another aspect of the present invention, there is a plastic dielectric manufactured by the plastic dielectric manufacturing method described above.

In another aspect of the present invention, there is a capacitor including the plastic dielectric described above.

The plastic dielectric manufactured by the plastic dielectric manufacturing method according to a preferred embodiment of the present invention has the ultrafine porous sponge structure, thereby providing improved dielectric constant properties and manufacturing capacitors with remarkably improved capacitance.

Additionally, the plastic dielectric according to a preferred embodiment of the present invention is manufactured using the plastic material which is more machinable than other materials, thereby improving productivity and reducing manufacturing costs.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings.

Figure 1:
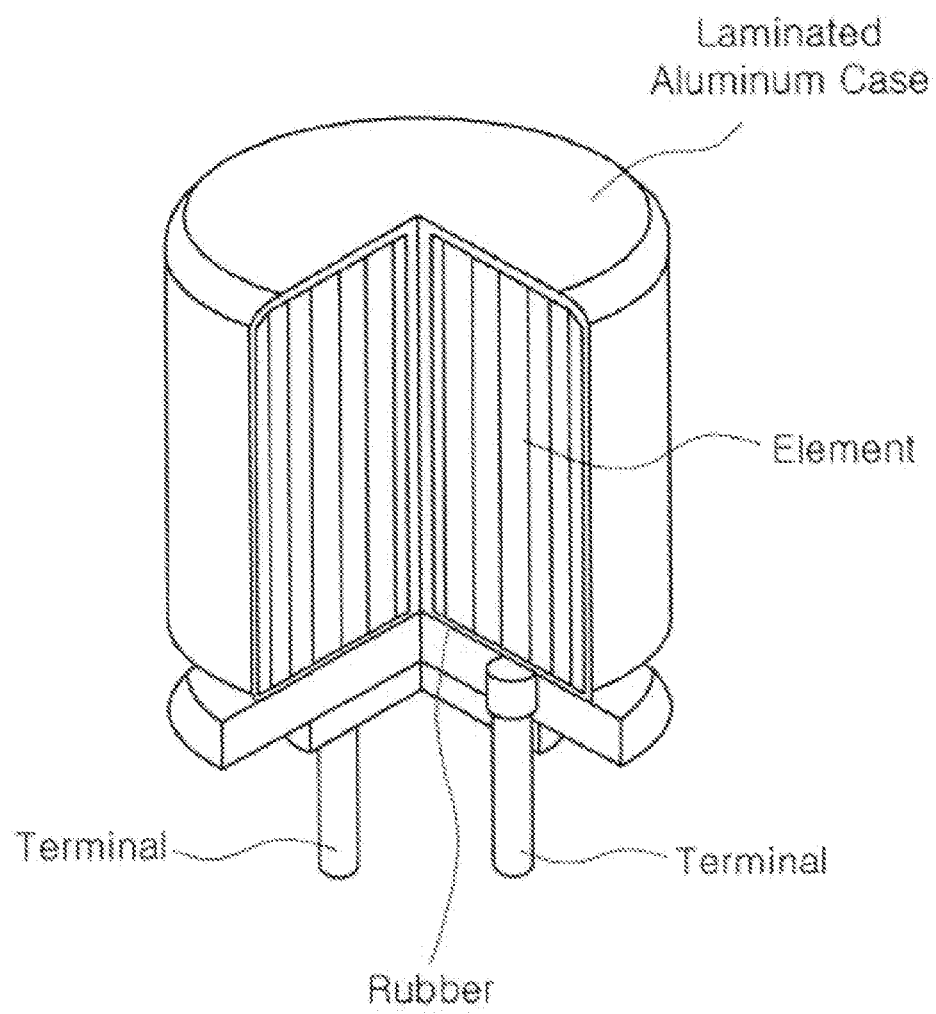
FIG. 1 is a view showing a structure of a conventional solid capacitor.
Figure 2:
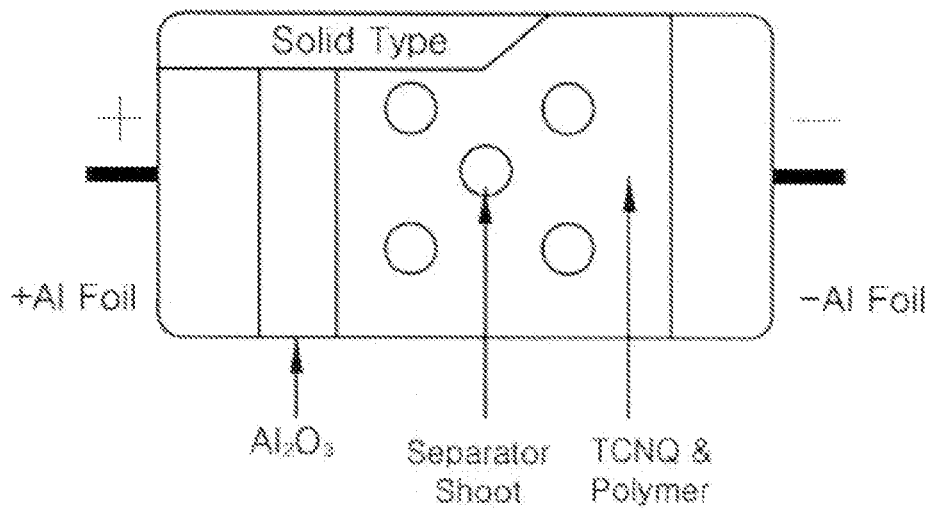
FIG. 2 is a mimetic diagram of the conventional solid capacitor and a conventional electrolytic capacitor.
Figure 2:
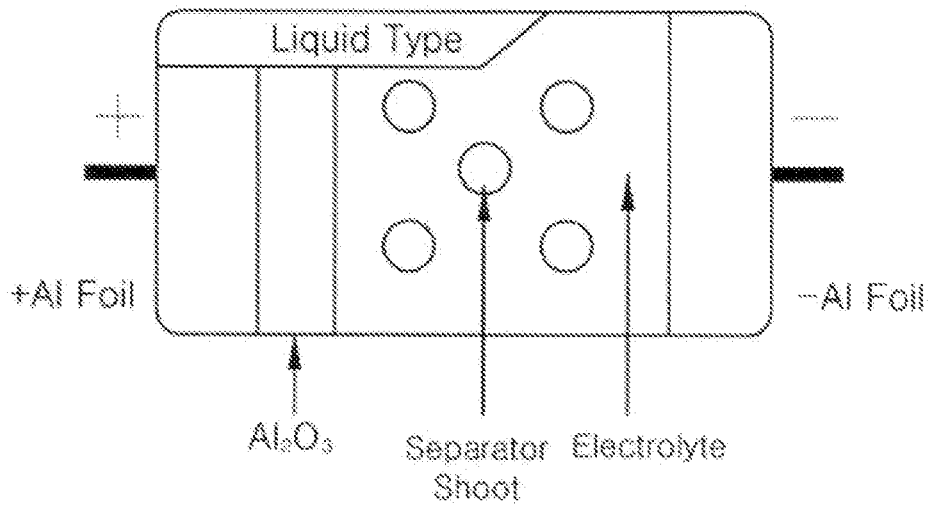
Figure 3:
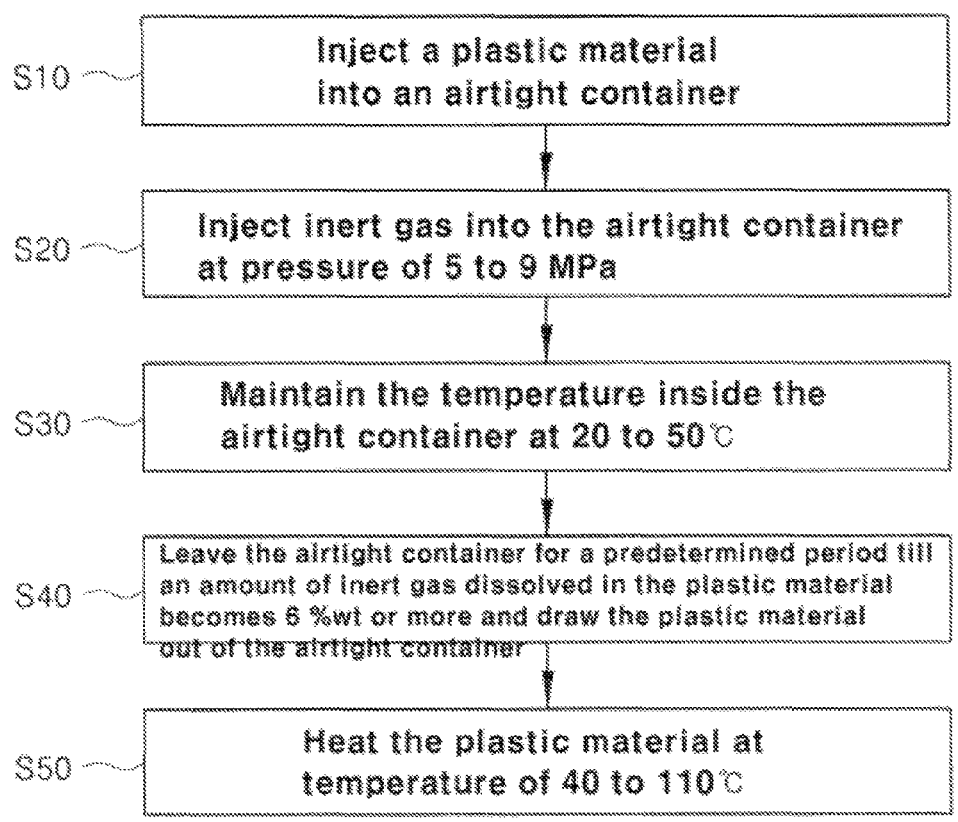
FIG. 3 is a flow chart of a method for manufacturing a plastic dielectric according to a preferred embodiment of the present invention.

FIG. 3 is a flow chart of a method for manufacturing a plastic dielectric according to a preferred embodiment of the present invention.

Referring to FIG. 3, the method for manufacturing a plastic dielectric according to the preferred embodiment of the present invention includes the steps of: (S10) injecting a plastic material into an airtight container; (S20) injecting inert gas into the airtight container at pressure of 5 to 9 MPa; (S30) maintaining the temperature inside the airtight container at 20 to 50° C.; (S40) leaving the airtight container for a predetermined period till an amount of inert gas dissolved in the plastic material becomes 6% wt or more and drawing the plastic material out of the airtight container; and (S50) heating the plastic material at temperature of 40 to 110° C.

Therefore, the plastic dielectric manufactured by such a manufacturing method may have a sponge structure in which a plurality of pores are formed. Moreover, through the manufacturing method according to the preferred embodiment of the present invention, the porous sponge structure having the radius of 1.0 μm or less can be easily formed because the step of drawing out the plastic dielectric uses the high-pressure inert gas.

Furthermore, kinds of inert gas are not specially limited if it can be dissolved into the plastic material and can form a number of pores inside the plastic material when the plastic material is drawn out of the airtight container. For instance, the inert gas may be $CO_2$, $N_2$, He or Ar.

In the meantime, the step of heating the drawn-out plastic material may be one selected from the steps of soaking the plastic material in glycerin or water heated at 40 to 110° C., using conduction by a plate heater, and using radiation by an IR heater.

Additionally, the step of drawing the plastic material out of the airtight container is not specially limited if the pores can be formed inside the plastic material, but for instance, the plastic material may be drawn out of the airtight container by injection or extrusion.

The following Table 1 shows an example of a test according to the preferred embodiment of the present invention.

TABLE 1

| | Contents | Remark |
|---|---|---|
| Plastic material | PET | — |
| Intrinsic dielectric constant | 3.47 | — |

TABLE 1-continued

| | Contents | Remark |
|---|---|---|
| Injected gas into high-pressure container | $CO_2$ | — |
| Injection pressure into high-pressure container | 8 MPa | — |
| Temperature inside high-pressure container | 45° C. | — |
| Dissolved amount of injected gas | 6% wt or more | — |
| Treatment after drawing out | Soaked in glycerin of 50° C. | — |
| Radius of pore | 0.3 μm or less | — |
| The number of pores | $10^{12}/cm^3$ or more | — |
| Dielectric constant result value | 3.63 | Increased 5% |

According to the Table 1, the plastic dielectric according to the preferred embodiment of the present invention can be manufactured through the steps of: injecting PET as a plastic material into an airtight container; injecting inert $CO_2$ into the airtight container at pressure of 8 MPa; maintaining the temperature inside the airtight container at 45° C.; drawing the plastic material out of the airtight container when an amount of $CO_2$ dissolved in the plastic material becomes 6% wt; and soaking the plastic material in glycerin at temperature of 50° C.

In the meantime, PET was used as the plastic material and the intrinsic dielectric constant of PET was 3.74, but the dielectric constant of the material manufactured by the plastic dielectric manufacturing method according to the preferred embodiment of the present invention was 3.63. Therefore, the material manufactured by the plastic dielectric manufacturing method according to the preferred embodiment of the present invention was improved by 5% in dielectric constant.

Figure 4:
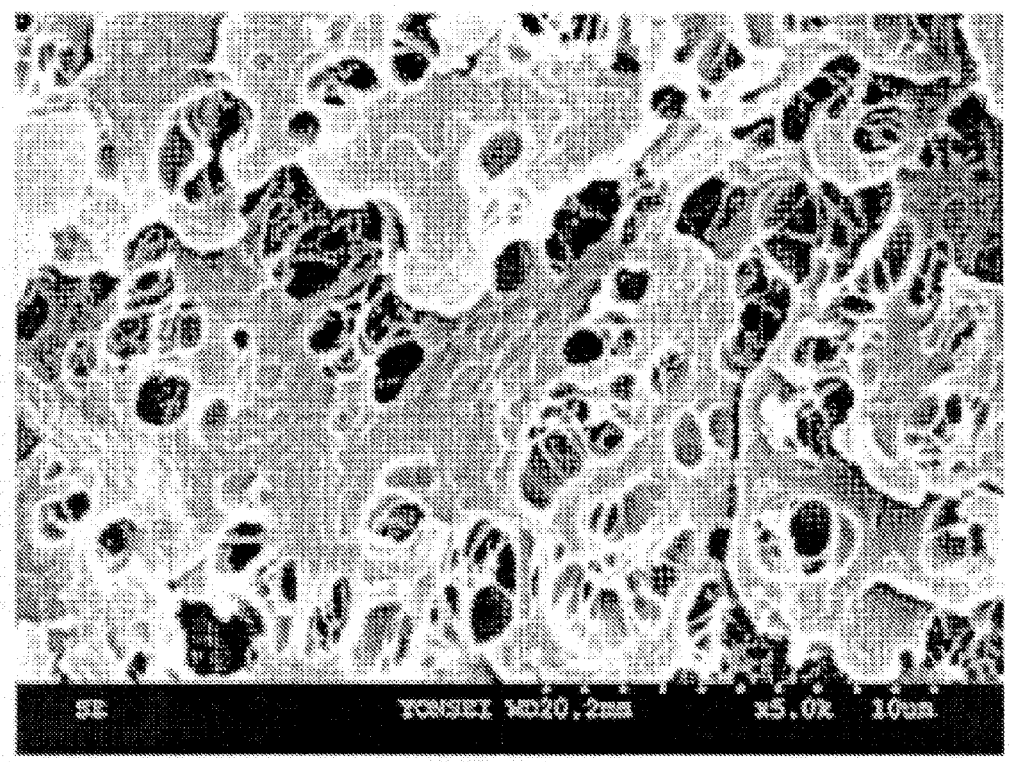
FIG. 4 is a photograph showing a cross-sectional structure of a plastic dielectric according to a preferred embodiment of the present invention.

FIG. 4 is a photograph showing a cross-sectional structure of a plastic dielectric manufactured according to the conditions of Table 1.

As shown in FIG. 4, the plastic dielectric manufacturing method according to the preferred embodiment of the present invention can manufacture the plastic dielectric of the sponge structure having a plurality of pores each of which is 0.3 μm or less in size and the plastic dielectric has 1,000,000,000,000 pores per 1 $cm^3$.

As a result, as shown in Table 1 and FIG. 4, the plastic dielectric manufacturing method according to the preferred embodiment of the present invention forms an ultrafine porous structure inside the plastic dielectric so as to enhance dielectric constant properties of the plastic dielectric.

The following Table 2 shows an example of a test according to another preferred embodiment of the present invention.

TABLE 2

| | Contents | Remark |
|---|---|---|
| Plastic material | PP | — |
| Intrinsic dielectric constant | 2.84 | — |
| Injected gas into high-pressure container | $CO_2$ | — |
| Injection pressure into high-pressure container | 5.5 MPa | — |

TABLE 2-continued

| | Contents | Remark |
|---|---|---|
| Temperature inside high-pressure container | 25° C. | — |
| Dissolved amount of injected gas | 6% wt or more | — |
| Treatment after drawing out | Soaked in glycerin of 100° C. | — |
| Radius of pore | 1.0 μm or less | — |
| The number of pores | $10^{10}/cm^3$ or more | — |
| Dielectric constant result value | 3.21 | Increased 13% |

According to the Table 2, the plastic dielectric according to the preferred embodiment of the present invention can be manufactured through the steps of: injecting PET as a plastic material into an airtight container; injecting inert $CO_2$ into the airtight container at pressure of 5.5 MPa; maintaining the temperature inside the airtight container at 100° C.; drawing the plastic material out of the airtight container when an amount of $CO_2$ dissolved in the plastic material becomes 6% wt; and soaking the plastic material in glycerin at temperature of 100° C.

In the meantime, PP was used as the plastic material and the intrinsic dielectric constant of PP was 2.84, but the dielectric constant of the material manufactured by the plastic dielectric manufacturing method according to the preferred embodiment of the present invention was 3.21. Therefore, the material manufactured by the plastic dielectric manufacturing method according to the preferred embodiment of the present invention was improved by 13% in dielectric constant.

Figure 5:
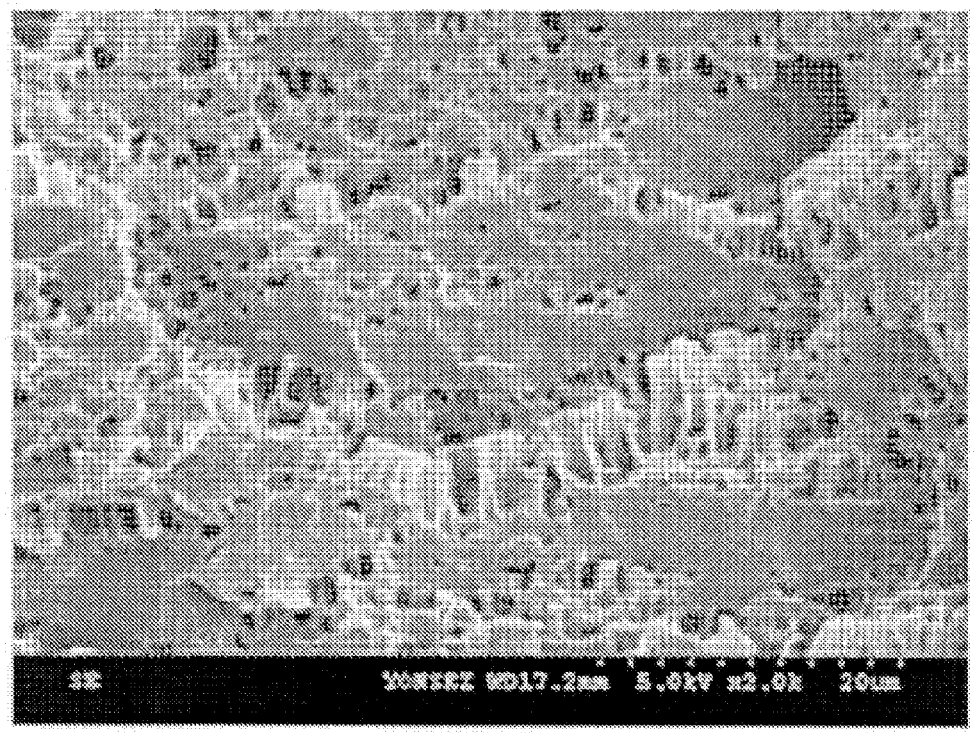
FIG. 5 is a photograph showing a cross-sectional structure of a plastic dielectric according to another preferred embodiment of the present invention.

FIG. 5 is a photograph showing a cross-sectional structure of a plastic dielectric manufactured according to the conditions of Table 2.

As shown in FIG. 5, the plastic dielectric manufacturing method according to the preferred embodiment of the present invention can manufacture the plastic dielectric of the sponge structure having a plurality of pores each of which is 1.0 μm or less in size and the plastic dielectric has 10,000,000,000 pores per 1 $cm^3$.

As a result, as shown in Table 2 and FIG. 5, the plastic dielectric manufacturing method according to the preferred embodiment of the present invention forms an ultrafine porous structure inside the plastic dielectric so as to enhance dielectric constant properties of the plastic dielectric.

The following Table 3 shows an example of a test according to a further preferred embodiment of the present invention.

TABLE 3

| | Contents | Remark |
|---|---|---|
| Plastic material | ABS | — |
| Intrinsic dielectric constant | 3.36 | — |
| Injected gas into high-pressure container | $CO_2$ | — |
| Injection pressure into high-pressure container | 8 MPa | — |
| Temperature inside high-pressure container | 45° C. | — |
| Dissolved amount of injected gas | 6% wt or more | — |
| Treatment after drawing out | Soaked in glycerin of 70° C. | — |
| Radius of pore | 0.3 μm or less | — |
| The number of pores | $10^{12}/cm^3$ or more | — |
| Dielectric constant result value | 3.86 | Increased 15% |

According to the Table 3, the plastic dielectric according to the preferred embodiment of the present invention can be manufactured through the steps of: injecting PET as a plastic material into an airtight container; injecting inert $CO_2$ into the airtight container at pressure of 8 MPa; maintaining the temperature inside the airtight container at 45° C.; drawing the plastic material out of the airtight container when an amount of $CO_2$ dissolved in the plastic material becomes 6% wt; and soaking the plastic material in glycerin at temperature of 70° C.

In the meantime, ABS was used as the plastic material and the intrinsic dielectric constant of PET was 3.36, but the dielectric constant of the material manufactured by the plastic dielectric manufacturing method according to the preferred embodiment of the present invention was 3.86. Therefore, the material manufactured by the plastic dielectric manufacturing method according to the preferred embodiment of the present invention was improved by 15% in dielectric constant.

Figure 6:
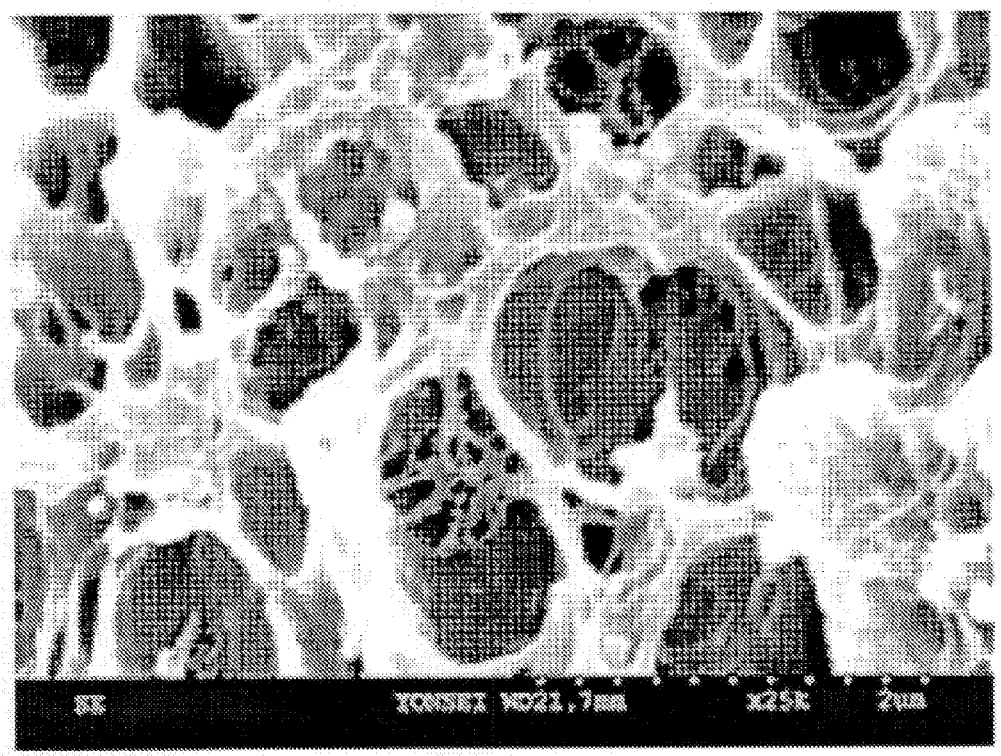
FIG. 6 is a photograph showing a cross-sectional structure of a plastic dielectric manufactured according to the conditions of Table 3.

FIG. 6 is a photograph showing a cross-sectional structure of a plastic dielectric manufactured according to the conditions of Table 3.

As shown in FIG. 6, the plastic dielectric manufacturing method according to the preferred embodiment of the present invention can manufacture the plastic dielectric of the sponge structure having a plurality of pores each of which is 0.3 μm or less in size and the plastic dielectric has 1,000,000,000,000 pores per 1 $cm^3$.

As a result, as shown in Table 3 and FIG. 6, the plastic dielectric manufacturing method according to the preferred embodiment of the present invention forms an ultrafine porous structure inside the plastic dielectric so as to enhance dielectric constant properties of the plastic dielectric.

The plastic dielectric manufactured by the plastic dielectric manufacturing method according to the preferred embodiments of the present invention has the ultrafine porous sponge structure, thereby providing improved dielectric constant properties and manufacturing capacitors with remarkably improved capacitance. Moreover, the plastic dielectric according to the preferred embodiments of the present invention is manufactured using the plastic material which is more machinable than other materials, thereby improving productivity and reducing manufacturing costs.

While the present invention has been described with reference to the particular illustrative embodiments, it is not to be restricted by the specific embodiments but only by the appended claims. It is to be understood by those skilled in the art that various modifications and equivalents can be made without departing from the spirit and scope of the present invention, as set forth in the appended claims.

What is claimed is:

1. A method for manufacturing a plastic dielectric which has a sponge structure comprised of a plurality of pores, the method comprising:
   inserting a plastic material into an airtight container;
   injecting inert gas into the airtight container at pressure of 5 to 9 MPa;

maintaining the temperature inside the airtight container at 20 to 50° C.;

leaving the airtight container for a predetermined period until an amount of inert gas dissolved in the plastic material becomes 6% wt or more and drawing the plastic material out of the airtight container; and heating the plastic material at temperature of 40 to 110° C., wherein the sponge structure has 1,000,000,000,000 pores per 1 $cm^3$.

2. The plastic dielectric manufacturing method according to claim 1, wherein in the heating the drawn-out plastic material, the drawn-out plastic material is soaked in glycerin or water heated at 40 to 110° C.

3. The plastic dielectric manufacturing method according to claim 1, wherein the heating the drawn-out plastic material is either the step of using conduction by a plate heater or the step of using radiation by an IR heater.

4. The plastic dielectric manufacturing method according to claim 1, wherein the inert gas is $CO_2$, $N_2$, He or Ar.

5. The plastic dielectric manufacturing method according to claim wherein each of the pores has the radius of 1.0 μm or less.

6. The plastic dielectric manufacturing method according to claim 1, wherein the plastic material is one or a mixture of two or more materials selected from a group composed of polyethylene terephthalate (PET), polypropylene (PP), acrylonitrile butadiene styrene copolymer (ABS), polyester, poly carbonate (PC), polyphenylene sulfide (PPS) and polytetrafluoroethylene (PTFE).

7. A method for manufacturing a plastic dielectric which has a sponge structure comprised of a plurality of pores, the method comprising:

inserting a plastic material into an airtight container;

injecting inert gas into the airtight container at pressure of 5 to 9 MPa;

maintaining the temperature inside the airtight container at 20 to 50° C.°;

leaving the airtight container for a predetermined period until an amount of inert gas dissolved in the elastic material becomes 6% wt or more and drawing the plastic material out of the airtight container; and heating the plastic material at temperature of 40 to 110° C.

wherein in the leaving, the predetermined period is 30 minutes to 180 minutes.

* * * * *